United States Patent [19]

Kawabata et al.

[11] Patent Number: 5,620,796
[45] Date of Patent: Apr. 15, 1997

[54] ACRYLIC EMULSION ADHESIVE, METHOD OF PRODUCTION, AND ADHESIVE TAPE OR SHEET, AND SURFACER

[75] Inventors: Kazuhiro Kawabata, Joyo; Norio Numata, Sakyo, both of Japan

[73] Assignee: Sekisui Kagaku Kogyo Kabushiki Kaisha, Osaka, Japan

[21] Appl. No.: 419,532

[22] Filed: Apr. 10, 1995

[30] Foreign Application Priority Data

Apr. 13, 1994 [JP] Japan .................................. 6-074877

[51] Int. Cl.$^6$ ....................................................... C09J 7/02
[52] U.S. Cl. ............................... 428/355 AC; 524/745; 524/747; 524/755; 524/757; 524/760; 524/831; 524/832; 524/833
[58] Field of Search ................................. 428/343, 355; 524/745, 747, 755, 757, 760, 831, 832, 833

[56] References Cited

U.S. PATENT DOCUMENTS 4,590,238  5/1986  Furomoto .............................. 524/745
5,324,862  6/1994  Yokota et al. .
5,332,854  7/1994  Yokota et al. .

FOREIGN PATENT DOCUMENTS 63-27572  2/1988  Japan .
9100740   2/1991  WIPO .

*Primary Examiner*—Jenna Davis
*Attorney, Agent, or Firm*—Townsend & Banta

[57] ABSTRACT

A method of producing an acrylic emulsion adhesive characterized in that a composition comprising 100 parts by weight of a monomeric mixture of alkyl (meth)acrylate, acrylic acid, methacrylic acid and N-vinylpyrrolidone, 0.5–2 parts by weight of a surfactant mixture of an anionic surfactant and a nonionic surfactant, and 0.03 to 0.5 part by weight of a polymerization initiator is subjected to emulsion polymerization reaction. The acrylic emulsion adhesive of this invention is rich in solids, features good adhesion and cohesion as well as high water resistance. Therefore, by coating one side of a transparent support, this adhesive can be used as an adhesive sheet for surface protection.

12 Claims, No Drawings

ACRYLIC EMULSION ADHESIVE, METHOD OF PRODUCTION, AND ADHESIVE TAPE OR SHEET, AND SURFACER

TECHNICAL FIELD

This invention relates to an acrylic emulsion adhesive, a method of producing thereof, an adhesive tape or sheet, and a surfacer.

BACKGROUND ART

Adhesive tapes and sheets are generally produced by coating a paper, nonwoven cloth, synthetic resin film or metal foil support or base with an adhesive and drying the adhesive coating layer.

As the adhesive mentioned above, either a solvent-type adhesive or an aqueous dispersion type emulsion adhesive is generally employed. However, since aqueous emulsion adhesives containing water as a dispersing medium do not contain any organic solvent, they are used on more and more occasions of late for the protection of health, prevention of atmospheric pollution and fire hazards, and conservation of resources.

The conventional acrylic emulsion adhesives of this type are generally produced by emulsion-polymerizing a monomeric mixture comprising a (meth)acrylic acid ester, as a predominant component, and one or more other copolymerizable vinyl monomers together with an emulsifier in aqueous medium. It has been reported that a high-solid acrylic polymer emulsion can be produced with good stability by using a surfactant mixture of an anionic surfactant and a nonionic surfactant in conducting such an emulsion polymerization reaction (Japanese Kokai Publication S-63-27572).

However, the above technology has the disadvantage that said surfactant mixture must be added in a comparatively large proportion of 2–15 parts by weight relative to 100 parts by weight of the monomer component with the result that the water resistance of the adhesive is decreased. Thus, the adhesive not only tends to suffer a loss of adhesion but undergoes opacification or whitening when immersed in water or in a high temperature, high humidity environment.

Particularly when the above emulsion polymer adhesive is used in the manufacture of an adhesive sheet for surface protection (surfacer) which, in use, is laminated onto a poster, paper label or the like for protecting the printed characters and design against external influences such as water, sunlight, etc., the characters and design tend to become invisible because of said whitening and, moreover, the surfacer may become detached from the poster or the like due to reduced adhesion.

Developed to obviate these disadvantages of the prior art, this invention has for its object to provide a method of producing an acrylic emulsion adhesive having improved water resistance without compromise in adhesion and a low-viscosity, high-solid feature with good polymerization stability, an acrylic emulsion adhesive having such desirable properties, and a surfacer comprising said adhesive on a base tape or sheet.

SUMMARY OF THE INVENTION

One of this invention is characterized by a method of producing an acrylic emulsion adhesive characterized by emulsion-polymerizing a mixture of (1) 100 parts by weight of a monomeric mixture of 90 to 98 weight % of (a) a C4–14 alkyl (methy)acrylate and 2 to 10 weight % of (b) acrylic acid, methacrylic acid and a polar monomer selected from the group consisting of N-vinylpyrrolidone and N-vinylcaprolactam, (2) 0.5 to 2 parts by weight of a surfactant mixture of 0.3 to 1.0 parts by weight of an anionic surfactant of formula (I) or (II) and 0.2 to 1.5 parts by weight of a nonionic surfactant,

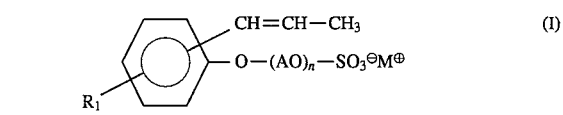

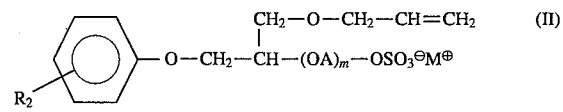

(wherein $R^1$ and $R^2$ each represents an alkyl group of 6 to 18 carbon atoms, an alkenyl group of 6 to 18 carbon atoms or an aralkyl group of 6 to 18 carbon atoms; m and n each represents a whole number of 8 to 40; A represents a substituted or unsubstituted alkylene group of 2 to 4 carbon atoms; $M^\oplus$ represents an alkali metal, ammonium or alkanolamine ion) and (3) 0.03 to 0.5 part by weight of a polymerization initiator.

DETAILED DESCRIPTION OF THE INVENTION

The monomeric mixture for use in the practice of this invention consists of (a) a c4–14 alkyl (meth)acrylate and (b) acrylic acid, methacrylic acid and a polar monomer selected from the group consisting of N-vinylpyrrolidone and N-vinylcaprolactam.

The above-mentioned alkyl (meth)acrylate (a) that can be used includes but is not limited to n-butyl (meth)acrylate, 2-ethylhexyl (meth)acrylate, isooctyl (meth)acrylate, isononyl (meth)acrylate and lauryl (meth)acrylate.

The proportion of said alkyl (meth)acrylate is 90 to 98 weight % based on the total weight of said monomeric mixture.

If said proportion is less than 90 weight %, the adhesion that can be obtained is not adequate, while the use of alkyl (meth)acrylate in excess of 98 weight % results in a decreased cohesive force of the adhesive. For enhanced adhesion, the proportion of n-butyl acrylate is preferably 50 weight % or more.

The proportion of the polar monomer (b), which is consisting of acrylic acid, methacrylic acid and a member of the group consisting of N-vinylpyrrolidone and N-vinylcaprolactam, should be within the range of 2 to 10 weight % based on the total weight of the monomeric mixture.

If the proportion of the polar monomer is less than 2 weight %, the stability of the emulsion is sacrificed and the adhesion of the adhesive is also decreased. On the other hand, if said proportion exceeds 10 weight %, the monomer stability in emulsion polymerization tends to decrease and the viscosity of the product emulsion tends to become increased.

In the method of producing an acrylic emulsion adhesive according to this invention, other copolymerizable vinyl monomers can also be used in combination with said monomers.

Among such copolymerizable vinyl monomers may be mentioned styrene, vinyl acetate, methyl (meth)acrylate, ethyl (meth)acrylate and 2-hydroxyethyl (meth)acrylate, to name but a few.

The preferred level of addition of said vinyl monomer or monomers is 0 to 40 parts by weight based on 100 parts by weight of said monomeric mixture.

In accordance with this invention, an emulsion polymerization reaction is carried out using said monomeric mixture, emulsifier and polymerization initiator in water. As said emulsifier, a surfactant mixture consisting of an anionic surfactant of formula (I) or (II) and a nonionic surfactant is employed.

As an example of the above-mentioned nonionic surfactant, a polyoxyethylene alkylphenyl ether compound of formula (V) can be mentioned.

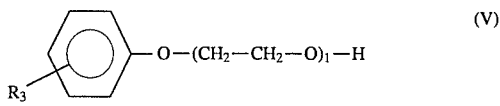

In the above formula (v), $R^3$ represents an alkyl group of 6 to 18 carbon atoms, an alkenyl group of 6 to 18 carbon atoms or an aralkyl group of 6–18 carbon atoms; 1 represents a whole number of 10 to 100.

Particularly for enhanced water resistance, the use of an unsaturation-containing nonionic surfactant of formula (III) or (IV) is preferred.

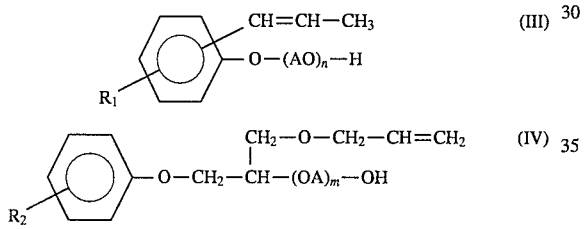

Referring to the above formulas (III) and (IV), $R^1$ and $R^2$ each represents an alkyl group of 6 to 18 carbon atoms, an alkenyl group of 6 to 18 carbon atoms or an aralkyl group of 6 to 18 carbon atoms; m and n each represents a whole number of 8 to 40; A represents a substituted or unsubstituted alkylene group of 2 to 4 carbon atoms.

The level of addition of said anionic surfactant is generally 0.3 to 1.0 part by weight and preferably 0.5 to 0.8 part by weight relative to 100 parts by weight of the monomeric mixture. If the amount is too low, the polymerization stability is decreased. On the other hand, if said surfactant is used in too large an amount, the water resistance of the adhesive is sacrificed.

The level of addition of said nonionic surfactant is 0.2 to 1.5 parts by weight, preferably 0.3 to 1.0 part by weight, based on 100 parts by weight of the monomeric mixture. The justification for the above range is the same as mentioned for the anionic surfactant.

The combined proportion of said anionic surfactant and nonionic surfactant is 0.5 to 2 parts by weight based on 100 parts by weight of the monomeric mixture. The justification for the above range is the same as mentioned for the anionic surfactant.

In using these anionic and nonionic surfactants, they may be added together to the monomeric mixture and/or water or added independently to said monomeric mixture and/or water. All that is necessary is that these two kinds of surfactants are present as a mixture in the emulsion polymerization system. The polymerization initiator mentioned above includes persulfates such as potassium persulfate, ammonium persulfate, etc., water-soluble azo compounds such as 4,4-azobis(cyanopentanoic acid), and a redox initiator system comprising hydrogen peroxide and a reducing agent. Particularly preferred is ammonium persulfate.

The proportion of said polymerization initiator is 0.03 to 0.5 part by weight based on 100 parts by weight of the monomeric mixture. If said proportion is smaller than the above range, the monomer addition rate is decreased. If it is larger than the above range, intra-particle crosslinking takes place to detract from adhesion.

The above emulsion polymerization can be performed batchwise or continuously, and any of the following methods can be employed: an omnibus feed method in which a reactor is charged with the monomeric mixture, emulsifier and polymerization initiator and the reaction is carried out, a monomer sequential feed method in which the reactor is charged with water, emulsifier and polymerization initiator and the monomeric mixture is then sequentially added over a few hours to conduct the polymerization, and an emulsifier sequential feed method in which the monomeric mixture is emulsified with water in which all or a portion of the emulsifier has been dissolved to prepare a monomer emulsion and this emulsion is sequentially added to an aqueous solution of the polymerization initiator to carry out the polymerization reaction.

The emulsion polymerization is carried out in the conventional manner, generally at a temperature of 50° to 90° C. with constant stirring for 1 to 10 hours. To control the molecular weight of the emulsion polymer, a chain transfer agent such as dodecylmercaptan can be employed.

To insure a high degree of adhesion, the weight average molecular weight of the acrylic emulsion polymer is preferably within the range of 200,000 to 1,000,000, more preferably 300, 000 to 600,000.

For improved emulsion stability, the polymer emulsion is preferably adjusted to a pH range of 6 to 8.5 with a pH control agent such as an amine compound or ammonia.

For enhanced adhesive power of the adhesive, a tackifier resin such as rosin-type, rosin ester-type, terpene-type, or C5 or C9 petroleum resin can be added to the monomer charge or after emulsion polymerization.

Moreover, for improved coatability, the viscosity of the emulsion can be adjusted with a viscosity modifier such as polyacrylic acid, water-soluble urethane resin or the like. In addition, an antifoam, a preservative and other additives can be added where necessary.

The acrylic emulsion adhesive of this invention can be produced by the method described above.

The acrylic emulsion adhesive of this invention may further comprise one or more crosslinking agents selected from the group consisting of polyfunctional aziridine compounds and polyfunctional carbodiimide compounds as added to the acrylic emulsion adhesive obtained by the above method.

Among said polyfunctional aziridine compounds is diphenylmethanebis-4,4'-N,N'-diethyleneurea which is commercially available under the tradename of Chemitite DZ-22E (Nippon Shokubai).

Among said polyfunctional carbodiimide compounds is commercially available under the tradename of Ucarlink XL-29SE(Union Carbide).

The above crosslinking agent is intended to enhance the cohesion of the adhesive and the preferred level of addition is 0.1 to 1.5 parts by weight relative to 100 parts by weight of the total monomer.

The adhesive tape or sheet of this invention comprises a base or support and, as disposed on oneside thereof, an adhesive layer formed from the acrylic emulsion adhesive obtained by the above-described method.

The base mentioned just above includes a sheet of paper or nonwoven cloth, a synthetic resin film, a sheet of synthetic resin foam, a metal foil, etc. In particular, polyester film and oriented polypropylene film (OPP) are suitable for use as the base or support of a surfacer because of their excellent clarity and mechanical properties.

The preferred thickness of said base is 20 to 40μm. For use as a surfacer, a base with an embossed reverse surface is especially desirable because the surroundings are not reflected on the underlying characters and design.

A typical technology for manufacturing said adhesive tape or sheet comprises coating the adhesive of this invention directly on one side or both sides of said base by means of, for example, a roll coater and drying the resulting adhesive coating layer by heating at 80° to 150° C. An alternative manufacturing technology is a transfer coating method which comprises coating said adhesive on a release sheet to form an adhesive layer and transferring this layer onto said base. The thickness of the adhesive layer of said adhesive tape or sheet can be liberally selected according to the intended application, but generally in consideration of the ease of use, is preferably 10 to 100μm and, particularly in the case of a surfacer, preferably 10 to 40μm.

When the above surfacer is laminated onto the surface of a poster or other display material for outdoor use, the display can be protected from the external influences of water, sunlight etc. so that the attractive appearance of the display can be preserved for a long time.

Since the use of reactive surfactants is limited to a necessary minimum, the adhesive of this invention is very satisfactory in moisture resistance, water resistance and resistance to whitening. In the prior art technologies, if the amounts of surfactants are decreased, the dispersion stability of the emulsion is adversely affected, while the use of surfactants in an excessive amount leads to deterioration of moisture resistance, water resistance and resistance to whitening of the adhesive.

In this invention, it appears that chiefly the nonionic surfactant acts in the way of a protective colloid to prevent coalescence of colloid particles and consequently insure good dispersibility in water and good emulsion stability.

On the other hand, the anionic surfactant also used in this invention, which has a polyoxy methylene chain in common with said nonionic surfactant, seems to enhance the above effects. The alkyl (meth)acrylate provides for a low glass transition temperature and cold (room temperature) adhesion. The comonomer acrylic acid, methacrylic acid, N-vinylpyrrolidone or N-vinylcaprolactam provides for a high degree of cohesion so that the adhesive displays a high degree of adhesion regardless of the degree of polarity of the substrate.

EXAMPLES

The following are examples of this invention. In the following description, all parts are by weight. (Preparation of an acrylic emulsion type adhesive dispersion) A 1-L reactor equipped with a thermometer, stirrer, reflux condenser and nitrogen gas inlet pipe was charged with 50 parts of deionized water in which 0.05 to 0.08 part of ammonium persulfate had been dissolved and the charge was warmed to 70° C. in a nitrogen atmosphere. According to the formulations indicated in Tables 1 to 5, the monomer, surfactant, n-dodecylmercaptan were stirred together with 30 parts of deionized water to prepare a monomer emulsion and fed to a drip funnel (As to n-dodecylmercaptan, ammonium persulfate and deionized water, the respective total amounts in parts by weight are shown in the tables).

TABLE 1

| Parts by weight | Example | | | | |
|---|---|---|---|---|---|
| | 1 | 2 | 3 | 4 | 5 |
| Monomer | | | | | |
| n-Butyl acrylate | 94 | 94 | 94 | 94 | 94 |
| 2-Ethylhexyl acrylate (2EHA) | — | — | — | — | — |
| Ethyl acrylate | — | — | — | — | — |
| Acrylic acid | 2 | 2 | 2 | 2 | 2 |
| Methacrylic acid | 2 | 2 | 2 | 2 | 2 |
| N-Vinylpyrrolidone | 2 | 2 | 2 | 2 | 2 |
| N-Vinylcaprolactam | — | — | — | — | — |
| Surfactant | | | | | |
| Aqualon HS-10 | — | — | 0.6 | 0.6 | — |
| Aqualon HS-20 | 0.6 | 0.6 | — | — | 0.6 |
| Eleminol ES-20 | — | — | — | — | — |
| Adeka Reasoap NE-10 | 0.4 | — | 0.4 | — | 0.8 |
| Noigen EA-120 | — | 0.4 | — | 0.4 | — |
| Others | | | | | |
| n-Dodecylmercaptan | 0.08 | 0.08 | 0.08 | 0.08 | 0.08 |
| Ammonium persulfate | 0.08 | 0.08 | 0.08 | 0.08 | 0.08 |
| Deionized water | 82 | 82 | 82 | 82 | 82 |
| Crosslinking agent | | | | | |
| Chemitite DZ-22E | 0.2 | 0.2 | 0.2 | 0.2 | 0.2 |
| Ucarlink XL 29SE | — | — | — | — | — |

TABLE 2

| Parts by weight | Example | | | | |
|---|---|---|---|---|---|
| | 6 | 7 | 8 | 9 | 10 |
| Monomer | | | | | |
| n-Butyl acrylate | 94 | 47 | 74 | 94 | 95 |
| 2-Ethylhexyl acrylate (2EHA) | — | 47 | — | — | — |
| Ethyl acrylate | — | — | 20 | — | — |
| Acrylic acid | 2 | 2 | 2 | 2 | 2 |
| Methacrylic acid | 2 | 2 | 2 | 2 | 1 |
| N-Vinylpyrrolidone | 2 | 2 | 2 | — | 2 |
| N-Vinylcaprolactam | — | — | — | 2 | — |
| Surfactant | | | | | |
| Aqualon HS-10 | — | — | — | — | — |
| Aqualon HS-20 | 0.6 | 0.6 | 0.6 | 0.6 | 0.6 |
| Eleminol ES-20 | — | — | — | — | — |
| Adeka Reasoap NE-10 | 1.2 | 0.4 | 0.4 | 0.4 | 0.4 |
| Noigen EA-120 | — | — | — | — | — |
| Others | | | | | |
| n-Dodecylmercaptan | 0.08 | 0.05 | 0.08 | 0.08 | 0.08 |
| Ammonium persulfate | 0.08 | 0.05 | 0.05 | 0.08 | 0.08 |
| Deionized water | 82 | 82 | 82 | 82 | 82 |
| Crosslinking agent | | | | | |
| Chemitite DZ-22E | 0.2 | 0.2 | 0.2 | 0.2 | 0.2 |
| Ucarlink XL 29SE | — | — | — | — | — |

TABLE 3

| Parts by weight | Example 11 | Example 12 | Example 13 | Example 14 |
|---|---|---|---|---|
| Monomer | | | | |
| n-Butyl acrylate | 94 | 94 | 94 | 94 |
| 2-Ethylhexyl acrylate (2EHA) | — | — | — | — |
| Ethyl acrylate | — | — | — | — |
| Acrylic acid | 2 | 2 | 2 | 2 |
| Methacrylic acid | 2 | 2 | 2 | 2 |
| N-Vinylpyrrolidone | 2 | 2 | 2 | 2 |
| N-Vinylcaprolactam | — | — | — | — |
| Surfactant | | | | |
| Aqualon HS-10 | — | — | — | — |
| Aqualon HS-20 | 0.6 | 0.6 | 0.6 | 0.6 |
| Eleminol ES-20 | — | — | — | — |
| Adeka Reasoap NE-10 | 0.4 | 0.4 | 0.4 | 0.4 |
| Noigen EA-120 | — | — | — | — |
| Others | | | | |
| n-Dodecylmercaptan | 0.08 | 0.08 | 0.08 | 0.08 |
| Ammonium persulfate | 0.05 | 0.08 | 0.08 | 0.08 |
| Deionized water | 82 | 82 | 82 | 82 |
| Crosslinking agent | | | | |
| Chemitite DZ-22E | 0.2 | — | 0.3 | — |
| Ucarlink XL 29SE | — | — | — | 1.0 |

TABLE 4

| Parts by weight | Comparative Example 1 | 2 | 3 | 4 | 5 |
|---|---|---|---|---|---|
| Monomer | | | | | |
| n-Butyl acrylate | 94 | 94 | 94 | 60 | 75 |
| 2-Ethylhexyl acrylate (2EHA) | — | — | — | — | — |
| Ethyl acrylate | — | — | — | 34 | 20 |
| Acrylic acid | 2 | 2 | 2 | 2 | 3 |
| Methacrylic acid | 2 | 2 | 2 | 2 | — |
| N-Vinylpyrrolidone | 2 | 2 | 2 | 2 | 2 |
| N-Vinylcaprolactam | — | — | — | — | — |
| Surfactant | | | | | |
| Aqualon HS-10 | — | — | — | — | — |
| Aqualon HS-20 | — | 0.2 | — | 0.6 | 0.6 |
| Eleminol ES-20 | 0.6 | — | — | — | — |
| Adeka Reasoap NE-10 | — | 0.4 | 1.0 | 0.4 | 0.4 |
| Noigen EA-120 | 0.4 | — | — | — | — |
| Others | | | | | |
| n-Dodecylmercaptan | 0.08 | 0.08 | 0.08 | 0.08 | 0.05 |
| Ammonium persulfate | 0.08 | 0.08 | 0.08 | 0.05 | 0.05 |
| Deionized water | 82 | 82 | 82 | 82 | 82 |
| Crosslinking agent | | | | | |
| Chemitite DZ-22E | 0.2 | — | — | — | 0.2 |
| Ucarlink XL 29SE | — | — | — | — | — |

TABLE 5

| Parts by weight | Comparative Example 6 | 7 |
|---|---|---|
| Monomer | | |
| n-Butyl acrylate | 75 | 96 |
| 2-Ethylhexyl acrylate (2EHA) | — | — |
| Ethyl acrylate | 20 | — |
| Acrylic acid | — | 2 |
| Methacrylic acid | 3 | 2 |
| N-Vinylpyrrolidone | 2 | 2 |
| N-Vinylcaprolactam | — | — |
| Surfactant | | |
| Aqualon HS-10 | — | — |
| Aqualon HS-20 | 0.6 | 0.6 |
| Eleminol ES-20 | — | — |
| Adeka Reasoap NE-10 | 0.4 | 0.4 |
| Noigen EA-120 | — | — |
| Others | | |
| n-Dodecylmercaptan | 0.05 | 0.08 |
| Ammonium persulfate | 0.05 | 0.08 |
| Deionized water | 82 | 82 |
| Crosslinking agent | | |
| Chemitite DZ-22E | 0.2 | 0.2 |
| Ucarlink XL 29SE | — | — |

Referring to Tables 1 to 5, the following species of the respective components were used.

Aqualon HS-10: tradename, manufactured by Dai-Ichi Kogyo Seiyaku [propenyl group-added polyoxyethylene nonylphenyl ether sulfonate ammonium salt; number of mols of ethylene oxide=10; formula (I)].

Aqualon HS-20: tradename, manufactured by Dai-Ichi Kogyo Seiyaku [propenyl group-added polyoxyethylene nonylphenyl ether sulfonate ammonium salt; number of mols of ethylene oxide=20, formula (I)].

Eleminol ES-20: tradename, manufactured by Sanyo Chemical Industries [polyoxyethylene nonylphenyl ether sulfate ammonium: number of mols of ethylene oxide=20).

Adeka Reasoap NE-10: tradename, manufactured by Asahi Denka [allyl group-added polyoxyethylene nonylphenyl ether; number of mols of ethylene oxide=10; formula (IV)] Noigen EA-120: tradename, manufactured by Dai-Ichi Kogyo Seiyaku [polyoxyethylene nonylphenyl ether; number of mols of ethylene oxide: 10, formula (v)].

The above monomer emulsion was dripped from the drip funnel into a reactor filled with 50 parts of deionized water containing the above-mentioned ammonium persulfate over a period of 3 hours to conduct an emulsion polymerization reaction. After completion of dropwise addition, the temperature of the reactor was increased to 90° C. and the reaction was further continued at 90° C. for 2 hours to provide an acrylic polymer emulsion. The polymer conversion rate was 99.5%.

After cooling to not more than 30° C., the above emulsion was neutralized with 0.64 part of 25% aqueous ammonia. Then, according to the formulations shown in Table 1 to 5, diphenylmethanebis-4,4'-N,N'-diethyleneurea (polyfunctional aziridine compound, tradename "Chemitite DZ-22E", manufactured by Nippon Shokubai) or "Ucarlink XL-29SE" (polyfunctional carbodiimide compound, tradename, manufactured by Union Carbide; R—N⊙C═N—R—N═C═N—R, molecular weight ca. 2000, R and the number of functional groups are undisclosed) was added to provide acrylic emulsion-type adhesive dispersions.

The performance characteristics of the acrylic emulsion-type adhesive dispersions obtained according Tables 1 to 5 were evaluated by the following methods.

(Evaluation methods)
(1. Polymerization stability)

Each of the above acrylic emulsion type adhesive dispersions is filtered through a 100-mesh stainless steel screen and dried at 110° C for 3 hours and the percentage of the residue on the screen relative to the total solid weight of the adhesive is calculated by means of the following equation. Polymerization stability (%)=dry weight of residue (g)×100/ weight of acrylic emulsion type adhesive dispersion (g)× solid matter (wt. %)

(2. Solid matter)

The acrylic emulsion type adhesive dispersion, 1.5g, is put in an aluminum cup and dried at 110° C. for 3 hours and the percentage of the dry weight relative to the weight of the emulsion type adhesive dispersion was calculated as solid matter (weight %).

(3. pH)

A pH meter (Sensonix Japan, Model CP-1) was immersed in the acrylic emulsion type adhesive dispersion and the pH was read after 1 minute.

(4. Viscosity)

Fifty (50) ml of the acrylic emulsion type adhesive dispersion in a 31 mm-diameter glass cuvette was rotated at 6 rpm using the No. 2 rotar of a BM erotary viscosimeter (manufactured by Tokyo Keiki, Model-BM), and the viscosity was read after 1 minute of rotation.

(5. Mechanical stability)

To 25 g of the acrylic emulsion type adhesive dispersion was added 25 g of deionized water to make 50 g and using a Marlon type mechanical stability tester (manufactured by Kyowa Intersurface Chemical Co., Emulsion/Latex Mechanical Stability Meter-Recorder CMS-A), the mixture was agitated at 1000 rpm under a pressure of 10 kg/cm2 for 5 minutes and the coagulation product in the vessel was collected by filtration using a 100-mesh metal screen and dried at 110° C. for 3 hours. Then, the percentage (weight %) of the dry weight of the coagulation product relative to the total solid weight was regarded as mechanical stability.

(Fabrication of a surfacer)

Using a 38 μm-thick polyethylene terephthalate (PET) film, one side of which had been subjected to corona discharge treatment, as the base film, the acrylic emulsion type adhesive dispersion obtained by the above-described method was coated on the corona discharge-treated surface using an applicator and dried at 110° C. for 8 minutes to provide a surfacer having a 25 μm-thick adhesive layer.

The surfacers obtained by the above method were evaluated by the following methods.

(6. Peeling strength with respect to stainless steel sheet) The peeling strength at 180° C. with respect to stainless steel sheet was measured according to JIS Z 1528.

(7. Peeling strength with respect to polypropylene sheet) The peeling strength at 180° C. with respect to polypropylene sheet was measured according to JIS z 1528.

(8. Holding power at 40° C.)

In accordance with JIS Z 1528, a load of 1 kg was applied to a specimen with an area of 20×20 mm in an atmosphere of 40° C. and 65% RH and the length of slip (mm) after 1 hour was determined.

(9. Holding power under high humidity conditions)

In accordance with JIS Z 1528, a load of 1 kg was applied to a specimen with an area of 20×20 mm in an atmosphere of 40° C. and 90% RH and the length of slip (mm) after 1 hour was determined.

(10. Resistance to whitening)

The surfacer is laminated on a polyester film and the laminate is cut to prepare a 100×25 mm sample.

The haze value of the above sample is measured with a haze meter (manufactured by Tokyo Denshoku, Model TC-HIIIDP). Then, the above sample is immersed in water at 23° C. for 4 days and taken out and the haze value is similarly measured.

(11. Gel fraction)

From each surfacer, 1.5 g of the adhesive is collected and put in a 50 ml sampling tube. After addition of 45 ml of tetrahydrofuran (THF), the tube is shaken on a shaker for 3 hours to prepare a THF-containing sample.

The above THF-containing sample is filtered through a 200-mesh metal screen and dried at 110° C. for 3 hours. With the residue regarded as the gel and the gel fraction (%) is calculated by means of the following equation.

Gel fraction (%)=dry weight of residue (g)/1.5 g×100 The results of performance evaluation of the acrylic emulsion-type adhesive dispersions and those of the protective surfacers are presented in Tables 6 to 10.

TABLE 6

| Evaluation Item | Example | | | | |
| --- | --- | --- | --- | --- | --- |
|  | 1 | 2 | 3 | 4 | 5 |
| Performance characteristics of the adhesive | | | | | |
| Polymerization stability (wt. %) | 0.01 | 0.01 | 0.01 | 0.01 | 0.01 |
| Solid matter (wt. %) | 53.5 | 54.0 | 53.7 | 53.6 | 53.9 |
| pH | 7.4 | 7.2 | 7.3 | 7.0 | 7.2 |
| Viscosity (cps) | 150 | 135 | 115 | 150 | — |
| Mechanical stability (wt. %) | 0.01 | 0.01 | 0.01 | 0.01 | 0.01 |
| Performance characteristics of the adhesive sheet Peeling (g/20 mm) | | | | | |
| Stainless steel sheet | 1080 | 1050 | 950 | 1020 | 1040 |
| Polypropylene sheet Holding power (mm) | 830 | 810 | 800 | 820 | 820 |
| 40 × 65% RH | 0 | 0 | 0 | 0 | 0 |
| 40 × 90% RH Resistance to whitening (Haze value | 0 | 0 | 0 | 0 | 0 |
| Untreated | 8.8 | 8.9 | 8.6 | 8.8 | 8.9 |
| 4-day immersion in water | 10.4 | 11.3 | 11.0 | 12.0 | 13.0 |
| Gel fraction (%) | 41.0 | 42.0 | 40.0 | 41.0 | 42.0 |

TABLE 7

| Evaluation Item | Example | | | | |
| --- | --- | --- | --- | --- | --- |
|  | 6 | 7 | 8 | 9 | 10 |
| Performance characteristics of the adhesive | | | | | |
| Polymerization stability | 0.01 | 0.01 | 0.01 | 0.01 | 0.01 |

TABLE 7-continued

| Evaluation Item | Example | | | | |
|---|---|---|---|---|---|
| | 6 | 7 | 8 | 9 | 10 |
| ity (wt. %) | | | | | |
| Solid matter (wt. %) | 53.3 | 53.3 | 53.2 | 53.2 | 53.8 |
| pH | 7.5 | 7.5 | 7.2 | 7.3 | 7.7 |
| Viscosity (cps) | — | — | — | — | — |
| Mechanical stability (wt. %) | 0.01 | 0.03 | 0.02 | 0.01 | 0.01 |
| Performance characteristics of the adhesive sheet | | | | | |
| Peeling strength (g/20 mm) | | | | | |
| Stainless steel sheet | 1010 | 880 | 980 | 1030 | 1010 |
| Polypropylene sheet | 750 | 750 | 810 | 850 | 820 |
| Holding power (mm) | | | | | |
| 40 × 65% RH | 0 | 0 | 0 | 0 | 0 |
| 40 × 90% RH | 0.5 | 0 | 0 | 0 | 0 |
| Resistance to whitening (Haze value) | | | | | |
| Untreated | 9.0 | — | — | — | — |
| 4-day immersion in water | 15.3 | — | — | — | — |
| Gel fraction (%) | 40.5 | 41.0 | 39.5 | 41.5 | 42.5 |

TABLE 8

| Evaluation Item | Example | | | |
|---|---|---|---|---|
| | 11 | 12 | 13 | 14 |
| Performance characteristics of the adhesive | | | | |
| Polymerization stability (wt. %) | 0.01 | 0.01 | 0.01 | 0.01 |
| Solid matter (wt. %) | 53.6 | 53.5 | 53.5 | 53.5 |
| pH | 7.6 | 7.4 | 7.4 | 7.4 |
| Viscosity (cps) | — | 150 | 150 | 150 |
| Mechanical stability (wt. %) | 0.01 | 0.01 | 0.01 | 0.01 |
| Performance characteristics of the adhesive sheet | | | | |
| Peeling strength (g/20 mm) | | | | |
| Stainless steel sheet | 1020 | 1600 | 950 | 1010 |
| Polypropylene sheet | 850 | 850 | 780 | 800 |
| Holding power (mm) | | | | |
| 40 × 65% RH | 0 | 1.0 | 0 | 0 |
| 40 × 90% RH | 0 | 2.0 | 0 | 0 |
| Resistance to whitening (Haze value) | | | | |
| Untreated | — | 8.6 | 8.9 | 9.8 |
| 4-day immersion in water | — | 9.8 | 13.6 | 15.0 |
| Gel fraction (%) | 40.0 | 0 | 55.0 | 43.0 |

TABLE 9

| Evaluation Item | Comparative Example | | | | |
|---|---|---|---|---|---|
| | 1 | 2 | 3 | 4 | 5 |
| Performance characteristics of the adhesive | | | | | |
| Polymerization stability (wt. %) | 0.01 | 0.5 | 3.0 | 0.8 | 0.01 |
| Solid matter (wt. %) | 53.7 | 53.2 | — | 53.4 | 53.7 |
| pH | 7.4 | 7.7 | — | 7.3 | 7.6 |
| Viscosity (cps) | — | — | — | — | — |
| Mechanical stability (wt. %) | 0.01 | 1.0 | — | 0.8 | 0.02 |
| Performance characteristics of the adhesive sheet | | | | | |
| Peeling strength (g/20 mm) | | | | | |
| Stainless steel sheet | 1010 | — | — | — | 750 |
| Polypropylene sheet | 750 | — | — | — | 550 |
| Holding power (mm) | | | | | |
| 40 × 65% RH | 1.0 | — | — | — | 0 |
| 40 × 90% RH | * | — | — | — | 0 |
| Resistance to whitening (Haze value) | | | | | |
| Untreated | 8.7 | — | — | — | — |
| 4-day immersion in water | 20.5 | — | — | — | — |
| Gel fraction (%) | 40.5 | — | — | — | 45.0 |

*: Fell after 40 minutes

TABLE 10

| Evaluation Item | Comparative Example | |
|---|---|---|
| | 6 | 7 |
| Performance characteristics of the adhesive | | |
| Polymerization stability (wt. %) | 0.01 | 0.1 |
| Solid matter (wt. %) | 53.4 | 53.5 |
| pH | 7.4 | 7.6 |
| Viscosity (cps) | — | — |
| Mechanical stability (wt. %) | 0.02 | 0.01 |
| Performance characteristics of the adhesive | | |
| Peeling strength (g/20 mm) | | |
| Stainless steel sheet | 710 | 1050 |
| Polypropylene | 720 | 650 |
| Holding power (mm) | | |
| 40 × 65% RH | 0 | 0 |
| 40 × 90% RH | 0 | 0 |
| Resistance to whitening (Haze value) | | |
| Untreated | — | — |
| 4-day immersion in water | — | — |
| Gel fraction | 46.0 | 43.5 |

INDUSTRIAL APPLICABILITY

The production method of this invention provides a very satisfactory acrylic emulsion adhesive having a low-viscosity, high-solid content feature without compromise of water resistance and satisfying necessary adhesion and cohesion requirements, with good stability during emulsion polymerization and good mechanical stability of the resulting emulsion.

The adhesive tape or sheet obtainable with the above acrylic emulsion adhesive according to this invention exhibits a very satisfactory adhesive performance satisfying both adhesion and cohesion requirements. Moreover, because of its high water resistance, the surfacer fabricated by depositing this adhesive on one side of a transparent base or support, in particular, offers the advantage that when laminated onto the surface of a poster or other display material for outdoor use, the surfacer protects the display material from environmental influences such as water, sunlight, etc. so that the attractive appearance of the display can be preserved over a long period of time.

We claim:

1. A method of producing an acrylic emulsion adhesive characterized by emulsion-polymerizing a mixture of
   (1) 100 parts by weight of a monomeric mixture of 90 to 98 weight % of (a) a C4–14 alkyl (methy)acrylate and 2 to 10 weight % of (b) acrylic acid, methacrylic acid and a polar monomer selected from the group consisting of N-vinylpyrrolidone and N-vinylcaprolactam,
   (2) 0.5 to 1.8 parts by weight of a surfactant mixture of 0.3 to 1.0 parts by weight of an anionic surfactant of formula (I) or (II) and 0.2 to 1.5 parts by weight of a nonionic surfactant,

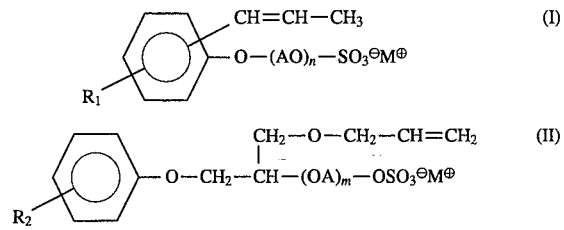

(wherein $R^1$ and $R^2$ each represents an alkyl group of 6 to 18 carbon atoms, an alkenyl group of 6 to 18 carbon atoms or an aralkyl group of 6 to 18 carbon atoms; m and n each represents a whole number of 8 to 40; A represents a substituted or unsubstituted alkylene group of 2 to 4 carbon atoms; $M^{\oplus}$ represents an alkali metal, ammonium or alkanolamine ion) and
   (3) 0.03 to 0.5 part by weight of a polymerization initiator.

2. The method of producing an acrylic emulsion adhesive as claimed in claim 1 wherein said nonionic surfactant is selected from the group consisting of surfactants of formula (III) and surfactants of formula (IV)

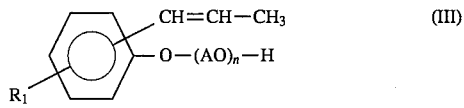

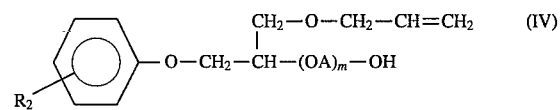

(wherein $R^1$ and $R^2$ each represents an alkyl group of 6 to 18 carbon atoms, an alkenyl group of 6 to 18 carbon atoms, or an aralkyl group of 6 to 18 carbon atoms, m and n each represents a whole number of 8 to 40; A represents a substituted or unsubstituted alkylene group of 2 to 4 carbon atoms).

3. The method of producing an acrylic emulsion adhesive of claim 1, wherein said monomeric mixture comprises at least 50 wt % of n-butyl acrylate.

4. The method of producing an acrylic emulsion adhesive of claim 2, wherein said monomeric mixture comprises at least 50 wt % of n-butyl acrylate.

5. Acrylic emulsion adhesive produced by the method of claim 1.

6. Acrylic emulsion adhesive of claim 5, further comprising at least one crosslinking agent selected from the group consisting of polyfunctional aziridine compounds and polyfunctional carbodiimide compounds.

7. An adhesive tape or sheet comprising a base tape or sheet having disposed on one side thereof an adhesive layer formed from the acrylic emulsion adhesive of claim 5.

8. An adhesive tape or sheet comprising a base tape or sheet having disposed on one side thereof an adhesive layer formed from the acrylic emulsion adhesive of claim 6.

9. The adhesive tape or sheet of claim 7 wherein said base tape or sheet is a polypropylene or polyester film.

10. The adhesive tape or sheet of claim 8 wherein said base tape or sheet is a polypropylene or polyester film.

11. A surfacer comprising the adhesive tape or sheet of claim 9.

12. A surfacer comprising the adhesive tape or sheet of claim 10.

* * * * *